United States Patent
Ono et al.

(10) Patent No.: US 7,257,385 B2
(45) Date of Patent: Aug. 14, 2007

(54) WIRELESS COMMUNICATION SEMICONDUCTOR INTEGRATED CIRCUIT DEVICE AND WIRELESS COMMUNICATION SYSTEM

(75) Inventors: Ikuya Ono, Takasaki (JP); Tamotsu Takahashi, Kitatachibana (JP)

(73) Assignee: Renesas Technology Corporation, Tokyo (JP)

( * ) Notice: Subject to any disclaimer, the term of this patent is extended or adjusted under 35 U.S.C. 154(b) by 362 days.

(21) Appl. No.: 10/948,183

(22) Filed: Sep. 24, 2004

(65) Prior Publication Data
US 2005/0075088 A1   Apr. 7, 2005

(30) Foreign Application Priority Data
Oct. 1, 2003   (JP)  ............................. 2003-342874

(51) Int. Cl.
*H04B 7/00* (2006.01)
(52) U.S. Cl. ................................ 455/232.1; 455/251.1; 455/253.2
(58) Field of Classification Search ............. 455/251.1, 455/252.1, 232.1, 253.2, 313, 333, 334, 323, 455/234.1, 250.1; 330/254
See application file for complete search history.

(56) References Cited

U.S. PATENT DOCUMENTS

| | | | |
|---|---|---|---|
| 5,758,271 A * | 5/1998 | Rich et al. ................ | 455/234.1 |
| 6,515,540 B1 * | 2/2003 | Prasad et al. ................ | 330/254 |
| 6,763,228 B2 * | 7/2004 | Prentice et al. ........... | 455/234.1 |
| 7,050,779 B2 * | 5/2006 | Ono et al. .................... | 455/333 |
| 2003/0020544 A1 * | 1/2003 | Behzad ........................ | 330/254 |
| 2003/0022646 A1 * | 1/2003 | Bult et al. ................ | 455/232.1 |
| 2005/0107056 A1 * | 5/2005 | Okasaka et al. .......... | 455/251.1 |
| 2005/0130617 A1 * | 6/2005 | Burns et al. ............. | 455/253.2 |

FOREIGN PATENT DOCUMENTS

JP   2003-152480   5/2003

* cited by examiner

*Primary Examiner*—Lana N. Le
(74) *Attorney, Agent, or Firm*—Mattingly, Stanger, Malur & Brundidge, P.C.

(57) ABSTRACT

A receiving circuit of a direct conversion system is provided which includes a differential amplifier circuit which amplifies a received signal, a mixer which combines the amplified received signal and an oscillation signal having a predetermined frequency to thereby perform frequency conversion, and a high gain amplifier circuit in which a plurality of programmable gain amplifiers and a plurality of filters which eliminate noise of the received signal and an unnecessary wave, are connected in a multistage and which is configured such that an amplification factor is varied according to the level of the received signal. In the receiving circuit, the low noise amplifier is brought to a non-operating state to thereby allow execution of a DC offset cancel operation of the corresponding programmable gain amplifier on the pre-stage side of the high gain amplifier circuit. Thereafter, the low noise amplifier is brought to an operating state to thereby allow execution of a DC offset cancel operation of the final-stage programmable gain amplifier.

14 Claims, 6 Drawing Sheets

WIRELESS COMMUNICATION SEMICONDUCTOR INTEGRATED CIRCUIT DEVICE AND WIRELESS COMMUNICATION SYSTEM

CROSS-REFERENCE TO RELATED APPLICATION

The present application claims priority from Japanese patent application No. 2003-342874 filed on Oct. 1, 2003, the content of which is hereby incorporated by reference into this application.

BACKGROUND OF THE INVENTION

The present invention relates to a technique effective if applied to a gain programmable signal amplifier circuit, a received signal amplifier circuit employed in a wireless communication system and a receiving circuit which down-converts a high frequency received signal into a signal lying in an audio frequency band on a direct conversion system basis, and to, for example, a technique effective suitable for application to a high frequency semiconductor integrated circuit device (hereinafter called high frequency IC) incorporating therein programmable gain amplifiers that constitute a wireless communication system, and a wireless communication system with the high frequency semiconductor integrated circuit device built therein.

A high frequency IC having frequency conversion of transmit-receive signals and a modem function has been used for recent cellular phones. A superheterodyne system which temporarily down-converts a received signal to an intermediate frequency signal and down-converts it to a signal lying in an audio frequency band, and a direct conversion system which down-converts a received signal to a signal lying in an audio frequency band are known for the conventional high frequency IC. The high frequency IC of the direct conversion system is configured in such a manner that an LNA (Low Noise Amplifier) amplifies a received signal and thereafter a mixer combines the received signal and a local oscillation signal, followed by being down-converted to a signal lying in an audio frequency band, and a high gain amplifier circuit amplifies the weak received signal to about 1500 times at the maximum and passes it to a baseband LSI which performs its baseband processing.

The high gain amplifier circuit takes a configuration wherein since it amplifies the weak received signal while removing noise and a signal having an unnecessary frequency, low pass filters LPFs and programmable gain amplifiers (hereinafter abbreviated as PGAs) are alternately connected in several stages. Incidentally, since an analog amplifier circuit starting with PGA produces a DC offset due to variations in element, etc., offset cancellation is essential.

As described above, the receiving circuit of the cellular phone using the plurality of PGAs has conventionally been provided with offset correction circuits every PGA in general. The receiving circuit has been configured so as to sequentially carry out offset cancellations in order from the first-stage PGA to the subsequent-stage PGAs. Such offset cancel operations of PGAs have been described in, for example, a patent document 1 (Japanese Unexamined Patent Publication No. 2003-152480).

SUMMARY OF THE INVENTION

Incidentally, although not described in the patent document 1, the offset cancel operations of PGAs are carried out in a state in which a pre-stage mixer is turned on and the LNA is turned off. The reason why the mixer is turned on, is that since the mixer also has an offset, the offset of the mixer and the offset of the first-stage PGA can be canceled out simultaneously when the mixer is held on upon the offset cancellation of the first-stage PGA. The reason why the offset cancellations of PGAs are performed in the turned-off state of the LNA, is that when the LNA is held on, a signal that leaks from a local oscillator is round-intruded into input terminals of the LNA via a semiconductor chip and a module substrate with the semiconductor chip mounted thereon, so that the mixer causes self-mixing, thereby generating a DC offset, which in turn is amplified by a high gain PGA section.

Meanwhile, the self-mixing due to the round intrusion of the local oscillation signal into the LNA input terminals can be reduced to some extent by using differential type circuits as the LNA and mixer and inphase noise cancel operations of the differential amplifiers. However, when pairing of the positive-phase and negative-phase sides of both single-differential converters configured of baluns or the like connected between an antenna and the input terminals of the LNA, and a front end module is poor, the inphase noise round-intruded into the input terminals of the LNA cannot be canceled sufficiently. Further, since module substrates each having a high frequency IC mounted thereon are different in structure, size and wiring pattern depending on users, the amount of leakage of the local oscillation signal round-intruded into the input terminals of the LNA varies too.

Therefore, the system for performing the offset cancellation of each PGA while the LNA remains off as described above is accompanied by the problem that when the LNA is turned on after the completion of the offset cancellation, the DC offset produced with self mixing due to the round intrusion of the local oscillation signal is amplified by the PGA. It has been revealed that although a shift in signal level due to such a DC offset has conventionally fallen within an allowable range, the dynamic range of an input to the baseband LSI also becomes narrow when the power supply voltage of the baseband LSI is lowered with a reduction in the voltage of a recent semiconductor integrated circuit, and hence a desired wave exceeds the dynamic range and is clipped even if the DC offset developed with self mixing due to the round intrusion of the local oscillation signal is the same as conventional, thereby causing a fear of degradation of reception sensitivity.

An object of the present invention is to provide a wireless communication semiconductor integrated circuit device (high frequency IC) of a direct conversion system, which is capable of canceling a DC offset developed with self mixing of a mixer due to round intrusion of a local oscillation signal into LNA input terminals and thereby improving reception sensitivity.

Another object of the present invention is to provide a wireless communication semiconductor integrated circuit device (high frequency IC) of a direct conversion system, which causes no degradation of reception sensitivity even if the dynamic range of an input to a circuit supplied with an amplified received signal is narrow.

A further object of the present invention is to provide a wireless communication semiconductor integrated circuit device (high frequency IC) of a direct conversion system, which has stable reception sensitivity without being affected by the characteristic of a mounted substrate.

The above, other objects and novel features of the present invention will become apparent from the description of the present specification and the accompanying drawings.

Summaries of representative ones of the inventions disclosed in the present application will be explained in brief as follows:

A first invention of the present application provides a receiving circuit of a direct conversion system, including a low noise amplifier which amplifies a differential received signal, a mixer which combines the amplified received signal and an oscillation signal having a predetermined frequency to thereby perform frequency conversion, and a high gain amplifier circuit in which a plurality of programmable gain amplifiers and a plurality of filters which eliminate noise of the received signal and an unnecessary wave, are connected in a multistage and which is configured such that an amplification factor is varied according to the level of the received signal, wherein the low noise amplifier is brought to a non-operating state to thereby allow execution of an offset cancel operation of the corresponding programmable gain amplifier on the pre-stage side of the high gain amplifier circuit, and thereafter the low noise amplifier is brought to an operating state to thereby allow execution of an offset cancel operation of the final-stage programmable gain amplifier.

According to such means, even if a DC offset occurs with self mixing of the mixer due to round intrusion of a local oscillation signal into LNA input terminals, the low noise amplifier is brought to the operating state to execute the offset cancel operation of the final-stage programmable gain amplifier, whereby offset cancellation can be performed inclusive of the DC offset of the final-stage programmable gain amplifier and the DC offset produced with the self mixing of the mixer.

Here, preferably, a register or control bit is provided which is capable of setting whether such a series of offset cancel operations that the low noise amplifier is brought to the non-operating state to allow the execution of the offset cancel operation of the programmable gain amplifier on the pre-stage side of the high gain amplifier circuit and thereafter the low noise amplifier is brought to the operating state to allow the execution of the offset cancel operation of the programmable gain amplifier of the final stage. Thus, such a system that the low noise amplifier is brought to the operating state to allow the execution of the offset cancel operation of the final-stage programmable gain amplifier, thereby increasing the DC offset on the contrary is capable of avoiding selective execution of such an offset cancel operation by virtue of the setting of the register.

A second invention of the present application provides a receiving circuit of a direct conversion system, including a low noise amplifier which amplifies a differential received signal, a mixer which combines the amplified received signal and an oscillation signal having a predetermined frequency to thereby perform frequency conversion, and a high gain amplifier circuit in which a plurality of programmable gain amplifiers and a plurality of filters which eliminate noise of the received signal and an unnecessary wave, are connected in a multistage and which is configured such that an amplification factor is varied according to the level of the received signal, wherein when the high gain amplifier circuit is operated with high gain, the low noise amplifier is brought to a non-operating state to allow execution of an offset cancel operation of the programmable gain amplifier on the pre-stage side of the high gain amplifier circuit, and thereafter the low noise amplifier is brought to an operating state to allow execution of an offset cancel operation of the final-stage programmable gain amplifier, and wherein when the high gain amplifier circuit is operated with low gain, the low noise amplifier is brought to the operating state to execute in sequence the offset cancel operations of all programmable gain amplifiers of the high gain amplifier circuit from, for example, the first stage to the final stage.

According to the above means, even if a DC offset occurs with self mixing of the mixer due to round intrusion of a local oscillation signal into LNA input terminals, the low noise amplifier is brought to the operating state to execute the offset cancel operation of the final-stage programmable gain amplifier where the high gain amplifier circuit is operated with the high gain, whereby offsets can be canceled inclusive of the DC offset of the final-stage programmable gain amplifier and the DC offset produced with the self mixing of the mixer. Further, when the high gain amplifier circuit is operated with the low gain, the low noise amplifier is brought to the non-operating state to execute in sequence the offset cancel operations of all programmable gain amplifiers of the high gain amplifier circuit from the first stage to the final stage, thereby making it possible to prevent each DC offset from increasing due to an interference wave inputted to the LNA and prevent the offset cancel operations from failing.

Here, preferably, a register is provided which sets gain reaching a threshold value for determining which one of the two offset cancel operations should be executed. Thus, the suitable offset cancel operation can be performed automatically by setting the optimum threshold value according to a system to be applied.

Advantageous effects obtained by representative ones of the inventions disclosed in the present application will be explained in brief as follows:

According to the present invention, a wireless communication semiconductor integrated circuit device (high frequency IC) of a direct conversion system is capable of canceling a DC offset developed with self mixing of a mixer due to round intrusion of a local oscillation signal into LNA input terminals. Therefore, even if the dynamic range of a subsequent-stage circuit is narrow, it is possible to prevent a desired wave from being clipped and thereby improve reception sensitivity.

According to the present invention as well, even if the amount of round intrusion of a local oscillation signal into LNA input terminals varies according to a mounted substrate, a DC offset developed with self mixing can be canceled. Therefore, it is possible to obtain a wireless communication semiconductor integrated circuit device (high frequency IC) of a direct conversion system which has stable reception sensitivity without being affected by the characteristic of the mounted substrate.

DETAILED DESCRIPTION OF THE PREFFERED EMBODIMENTS

Preferred embodiments of the present invention will hereinafter be described in detail with reference to the accompanying drawings.

Figure 1:
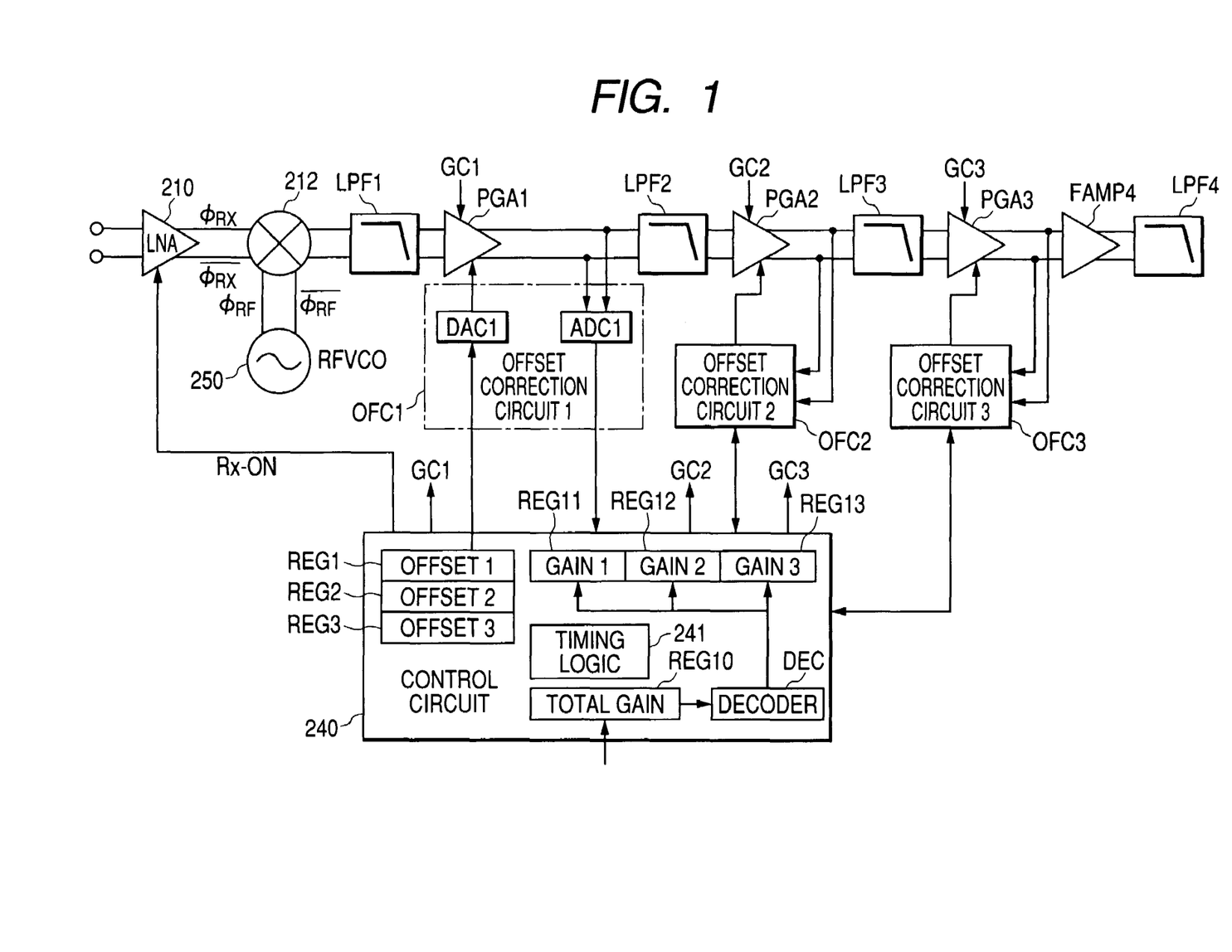
FIG. 1 is a block diagram showing an embodiment of a reception system circuit of a direct conversion system employed in a wireless communication system of a cellular phone or the like suitable for application of the present invention.

A reception system circuit of a direct conversion system employed in a wireless communication system of a cellular phone or the like suitable for application of the present invention is shown in FIG. 1.

The reception system circuit according to the present embodiment comprises an LNA (Low Noise Amplifier) 210 which amplifies a received signal, an oscillator 250 which generates a local oscillation signal φRF, a mixer 212 which combines the received signal amplified by the LNA 210 and the local oscillation signal φRF generated by the oscillator 250 and down-converts the result of combination to a signal lying in an audio frequency band, and a high gain amplifier circuit 220 which amplifies the down-converted signal.

In the high gain amplifier circuit 220, a first variable gain amplifier (programmable gain amplifier) PGA1 is connected to a stage subsequent to a first low pass filter LPF1, a second low pass filter LPF2 is connected to a stage subsequent to the programmable gain amplifier PGA1, and a second programmable gain amplifier PGA2 is connected to a stage subsequent to the second low pass filter LPF2. Further, a third low pass filter LPF3 is connected to a stage subsequent to the second programmable gain amplifier PGA2, and a third programmable gain amplifier PGA3 is connected to a stage subsequent to the third low pass filter LPF3. Furthermore, a final amplifier FAMP capable of switching gain to two stages is connected to a stage subsequent to the third programmable gain amplifier PGA3, and a fourth low pass filter LPF4 is connected to a stage subsequent to the final amplifier FAMP. In the present embodiment, although not restricted in particular, a primary filter is used for the first low pass filter LPF1, and a secondary filter is used for the second through fourth low pass filters LPF2 through LPF4. Thus, a relatively flat frequency characteristic is obtained as a whole, and an interference wave having a frequency 3 MHz away from a receiving band can be reduced sufficiently.

Incidentally, the programmable gain amplifiers PGA1 through PGA3 are amplifiers capable of adjusting gain substantially linearly or in a multistage. The final amplifier FAMP is capable of making use of a fixed gain amplifier since the gain is uniquely determined if the type of a baseband circuit determined by the system, i.e., used therein is decided. In the present embodiment, however, an amplifier capable of switching gain to two stages or so is used to enable the selection of the gain according to an adaptive system, thereby enhancing general versatility of a high frequency LSI200.

In the reception system circuit according to the present embodiment, a first offset correction circuit or corrector OFC1 is provided corresponding to the first programmable gain amplifier PGA1, a second offset correction circuit or corrector OFC2 is provided corresponding to the second programmable gain amplifier PGA2, and a third offset correction circuit or corrector OFC3 is provided corresponding to the third programmable gain amplifier PGA3. A control circuit 240, which sequentially operates the offset correction circuits OFC1 through OFC3 to carry out offset cancel processing and performs on/off-control of the LNA 210, is provided in association with the offset correction circuits OFC1 through OFC3.

In the present embodiment, although not restricted in particular, the offset correction of the first programmable gain amplifier PGA1 is executed inclusive of the mixer 212. Such a correction is performed as follows: In a state in which, for example, the LNA 210 is turned off and differential input terminals of the mixer 212 are brought to the same potential, the difference in level between output signals of the PGA1 at that time, i.e., an offset voltage is detected by the offset correction circuit OFC1, and such a potential as to bring it to "0" is applied between input terminals of the PGA1, whereby an offset cancel operation can be performed more accurately.

As indicated by the first offset correction circuit OFC1 as a representative of the offset correction circuits OFC1 through OFC3, it comprises an AD converter ADC1 which AD-converts the output of the amplifier PGA1, and a DA converter DAC1 which DA-converts a value retained in each register provided within the control circuit 240 and adjusts the value of current flowing through a current source of the amplifier PGA1, or the like to thereby correct an offset. The registers REG1 through REG3, which hold offset correction values corresponding to the offset correction circuits OFC1 through OFC3, are provided within the control circuit 240. On the basis of values obtained by AD-converting the differences in level between the output signals of the amplifiers by means of the AD converters ADC1 in a state in which the input terminals of the respective amplifiers are respectively brought to the same potential, such correction values as to bring the differences, i.e., offset voltages to "0" are determined and retained in their corresponding registers. The determination of the correction values can sequentially be performed by comparative AD converting operations.

Further, the control circuit 240 is provided therewithin with a register REG10 which holds data (gain code) used to specify or designate total gain supplied from a baseband circuit 300 at the receiving operations of the programmable gain amplifiers PGA1 through PGA3, a decoder DEC which decodes the code set to the register REG10 to generate a code for designating gain of each of the amplifiers PGA1 through PGA3, registers REG11 through REG13 each of which retains the gain code generated by the decoder DEC, a timing logic 241 which operates the offset correction circuits OFC1 through OFC3 with predetermined timing and generates timing signals GC1 through GC3 for performing switching among the gains of the programmable gain amplifiers PGA1 through PGA3 on the basis of the values retained in the registers REG11 through REG13, etc.

Figure 2A:
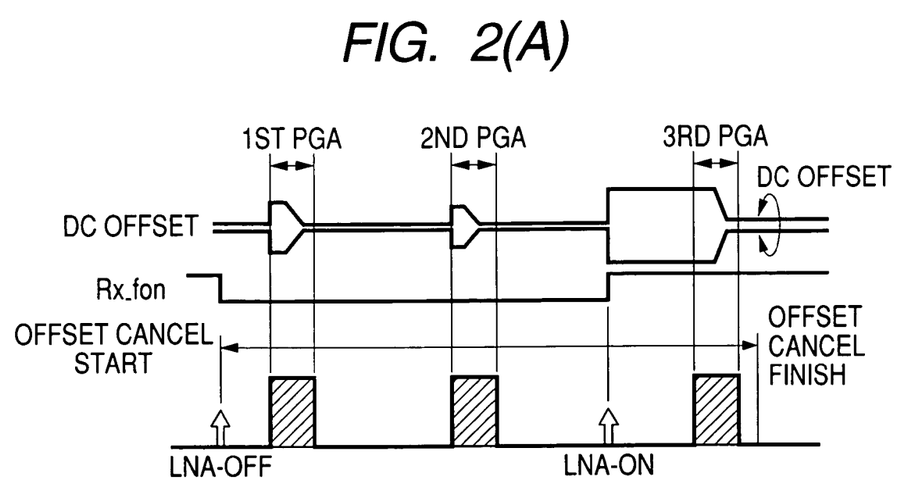
FIG. 2 is a timing chart illustrating offset correction timings for a first operation mode of PGA employed in the reception system circuit according to the embodiment and offset correction timings for a second operation mode thereof.
Figure 2B:
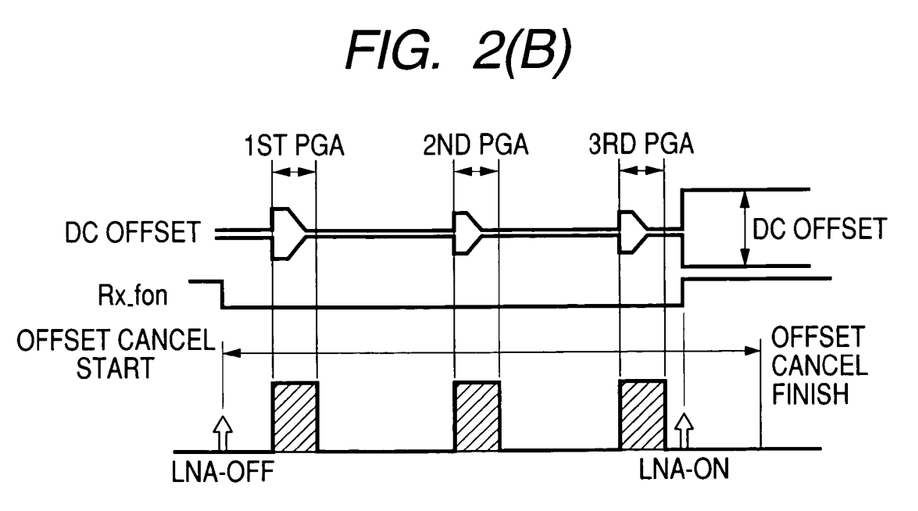

As shown in FIG. 2(A), the reception system circuit according to the present embodiment is configured so as to have a second operation mode (see FIG. 2(B)) for sequentially performing offset cancellations of the programmable gain amplifiers PGA1 (including the mixer), PGA2 and PGA3 by the offset correction circuits OFC1, OFC2 and OFC3 while the LNA 210 remains off in a manner similar to the conventional example, in addition to a first operation mode for sequentially performing the offset cancellations of the programmable gain amplifiers PGA1 (including the mixer) and PGA2 by the offset correction circuits OFC1 and OFC2 firstly in a state in which the LNA 210 has been turned off, and thereafter performing the offset cancellation of the programmable gain amplifier PGA3 by the offset correction circuit OFC3 in a state in which the LNA 210 has been turned on. Incidentally, the offset cancel operations of the programmable gain amplifiers PGA1 through PGA3 are executed in a state in which the gains of the PGA1 through PGA3 have been set, in such a manner that the total gain stet to the register REG10 from outside at that time is obtained.

Further, in the reception system circuit according to the present embodiment, a means or mechanism for automatically selecting any one of the first operation mode for performing the offset cancellation of the programmable gain amplifier PGA3 in the state in which the LNA 210 is being turned on when the gains set to the PGA1 through PGA3 are high, and the second operation mode for sequentially performing the offset cancellations of the programmable gain amplifiers PGA1 through PGA3 while the LNA 210 remains off when the gains set to the PGAs are low, thereby to carry out at least one offset cancellation, and a means or mechanism for carrying out the offset cancellations in either the first operation mode or the second operation mode according to a designation given from outside are provided in the control circuit 240.

Figure 3:
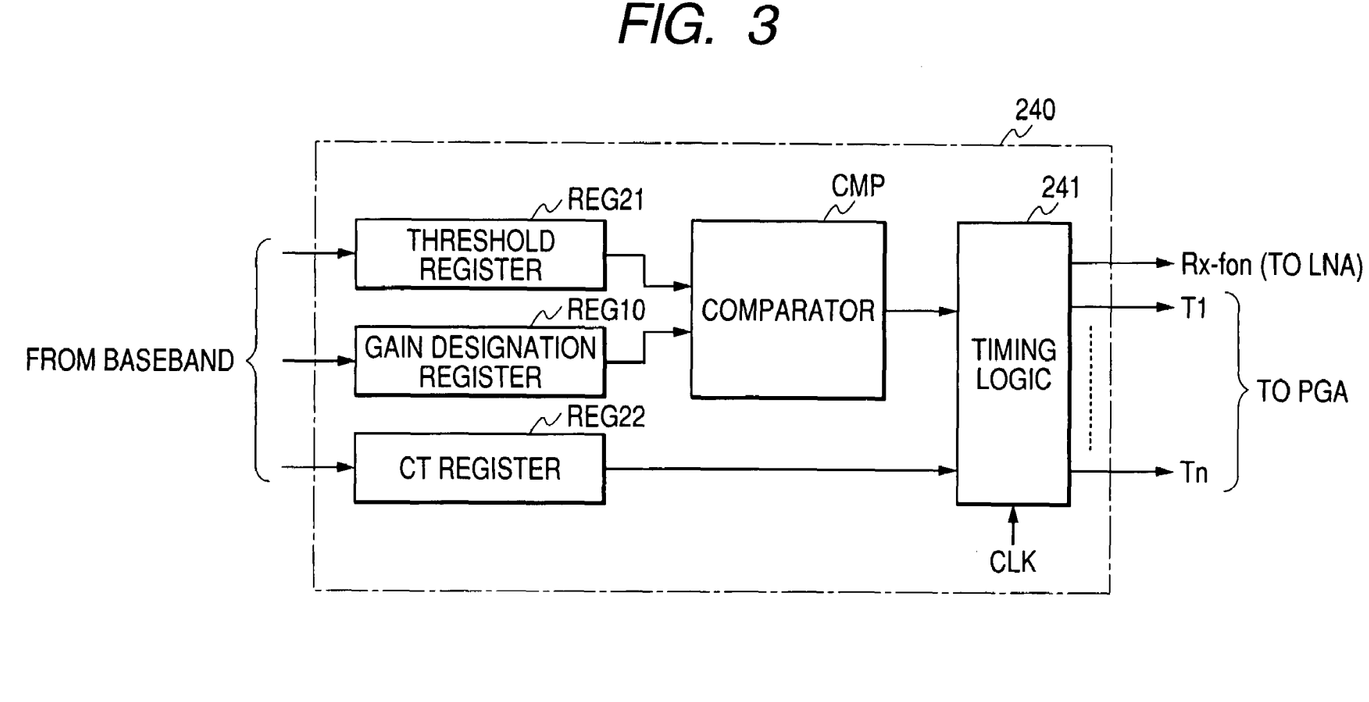
FIG. 3 is a block diagram showing a configurational example of a control circuit for controlling offset correction circuits employed in the reception system circuit according to the embodiment.

As shown in FIG. 3, the mechanism for automatically selecting either the first operation mode or the second operation mode according to the set gains comprises a threshold register REG21 which sets a threshold value upon mode selection, a comparator CMP which compares the set value of the threshold register REG21 and a set value (total gain) of a gain designation register REG10, etc. The setting of the threshold register REG21 is performed once at power-on. The setting of the gain designation register REG10 is performed corresponding to a received level upon stating of a reception mode. The threshold value to be set is determined depending on, for example, how much the level is necessary for a baseband circuit to be used, as an input signal. The timing logic 241 generates and outputs such timing signals as to execute offset cancellations in the first operation mode when the gains set to the PGA1 through PGA3 are higher than the threshold value and in the second operation mode when the gains set to the PGA1 through PGA3 are lower than the threshold value, respectively, in accordance with the result of comparison by the comparator CMP.

Here, the reason why the offset cancellations are respectively executed in the first operation mode when the gains set to the PGA1 through PGA3 are higher than the threshold value and in the second operation mode when the gains set to the PGA1 through PGA3 are lower than the threshold value, is that although the low pass filters LPF1 through LPF3 are capable of sufficiently reducing the interference wave having the frequency 3 MHz away from the receiving band, they are not capable of sufficiently reducing an interference wave a few hundred kHz away therefrom.

Described specifically, even if the interference wave of 3 MHz is inputted from the LNA upon execution of the offset cancellations and amplified by PGA1 and PGA2 where the gains set to the PGA1 through PGA3 are high, i.e., where a signal level at an antenna end is small, it is attenuated to such an extent that no interference occurs in the low pass filters LPF1 through LPF3. Since, however, the low pass filters LPF1 through LPF3 are not capable of sufficiently reducing an interference wave of a few hundred kHz, the interference wave of the few hundred kHz is amplified in the second operation mode for canceling the offsets of all the programmable gain amplifiers PGA1 through PGA3 in the turn-off state of the LNA 210 when the LNA is turned on after completion of the offset cancellations, and inputted to the PGA3 without being subjected to attenuation sufficiently. Therefore, when pairing with a stage prior to the input terminals of the LNA 210 is poor, a DC offset caused by the interference wave appears, and when an interference wave contained in a signal inputted to the PGA3 is large, the input signal of the AD converter changes during the operation of each offset correction circuit and hence the offset cancel operation per se will fail. Thus, when the gain set to the PGA is higher than the threshold value, the offset cancellation of the programmable gain amplifier PGA3 is performed in the state in which the LNA 210 has been turned on. Consequently, the first operation mode for performing the offset cancellations inclusive of the DC offset of the LNA becomes effective.

On the other hand, when the gains set to the PGA1 through PGA3 are low, i.e., the signal level at the antenna end is high, a shift in PGA output developed upon execution of cancellation in a state in which the LNA 210 is turned on and the interference wave of the few hundred kHz sufficiently non-attenuated by the low pass filters LPF1 through LPF3 is amplified by PGA1 and PGA2 and inputted to the PGA3, becomes larger than a shift in PGA output due to a DC offset developed by self-mixing of the mixer with round intrusion of the local oscillation signal into the LNA input terminals when the LNA is turned off and the LNA is turned on after the offset cancellations of PGA1 through PGA3. Therefore, when the gains set to the PGAs are low, the second operation mode for sequentially performing the offset cancellations of the programmable gain amplifiers PGA1 through PGA3 while the LNA 210 remains off, becomes effective.

Figure 4:
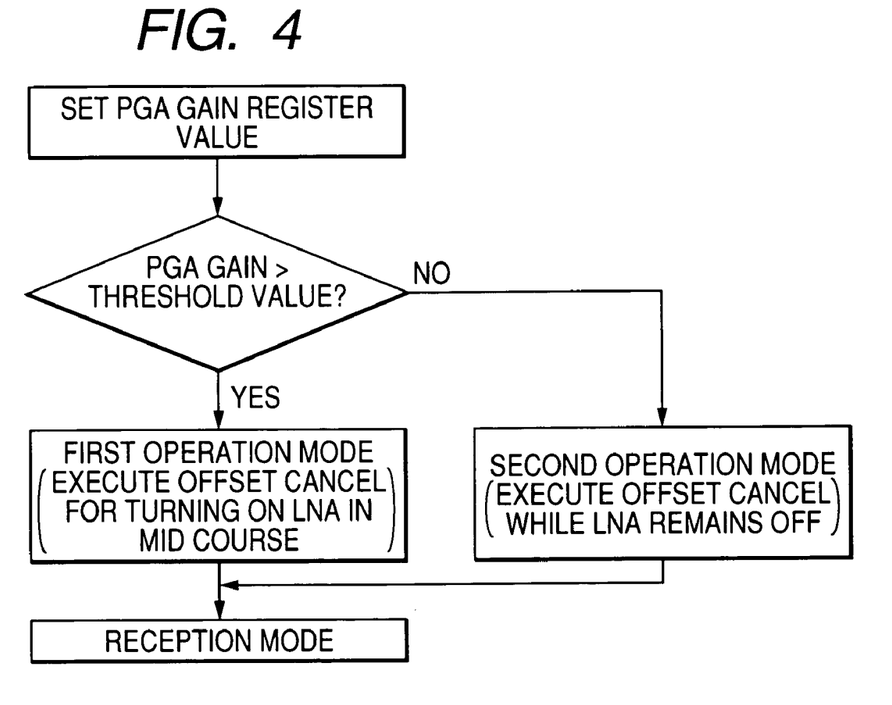
FIG. 4 is a flowchart showing a method of selecting an offset correction for the first operation mode of PGA employed in the reception system circuit according to the embodiment and an offset correction for the second operation mode thereof.

As shown in FIG. 4, the timing logic 241, which generates an on/off control signal Rx_fon and timing signals T1 through Tn relative to the offset correction circuits OFC1 through OFC3 for PGA1 through PGA3, compares the set value of the threshold register REG21 and the total gain of PGAs after the setting of the total gain of PGAs from the outside (baseband LSI) to the register REG10, and generates such timing signals as to execute the offset cancellation based on the first operation mode for turning on the LNA in mid course when the PGA gain is lower than the threshold value and to execute the offset cancellation based on the second operation mode for causing the LNA to remain off when the PGA gain is higher than the threshold value.

On the other hand, the mechanism for allowing execution of the offset cancellations in either the first operation mode or the second operation mode in accordance with the external designation is enabled by provision of a register (hereinafter called CT register) REG22 which designates the operation mode as shown in FIG. 3. The setting of the CT register REG22 is performed upon starting of a reception mode. The CT register REG22 is not limited to one comprising plural bits but may be one configured of a one-bit flag. A bit for designating the operation mode and a bit indicative of whether the setting of the corresponding register is valid or invalid, can be provided in the CT register REG22.

Figure 5:
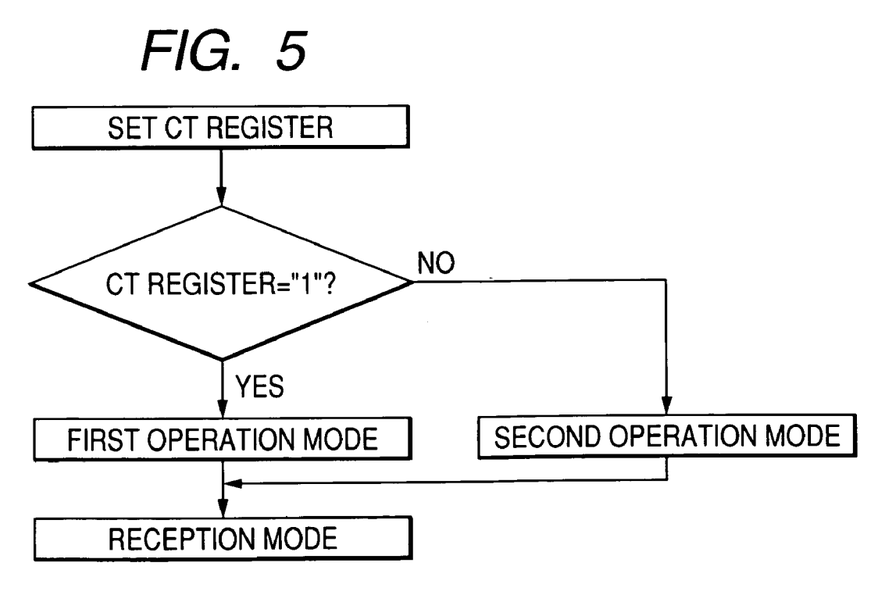
FIG. 5 is a flowchart showing another example of a method of selecting an offset correction for the first operation mode of PGA employed in the reception system circuit according to the embodiment and an offset correction for the second operation mode thereof.

When the setting to the CT register REG22 is carried out as shown in FIG. 5, the timing logic 241 generates such a timing signal as to carry out an offset cancellation based on the first operation mode or an offset cancellation based on the second operation mode according to the set state of the CT register REG22.

Incidentally, the timing logic 241 may be configured in such a way as to generate such a timing signal that when the setting to the threshold register REG21 has been made, the set value of the threshold register REG21 and the total gain of PGAs are compared based on the set state of the threshold register REG21 to thereby carry out the offset cancellation based on the first operation mode or the second operation mode and to generate such a timing signal as to allow the execution of the offset cancellation based on the first operation mode or the second operation mode according to the set state of the CT register REG22.

Figure 6:
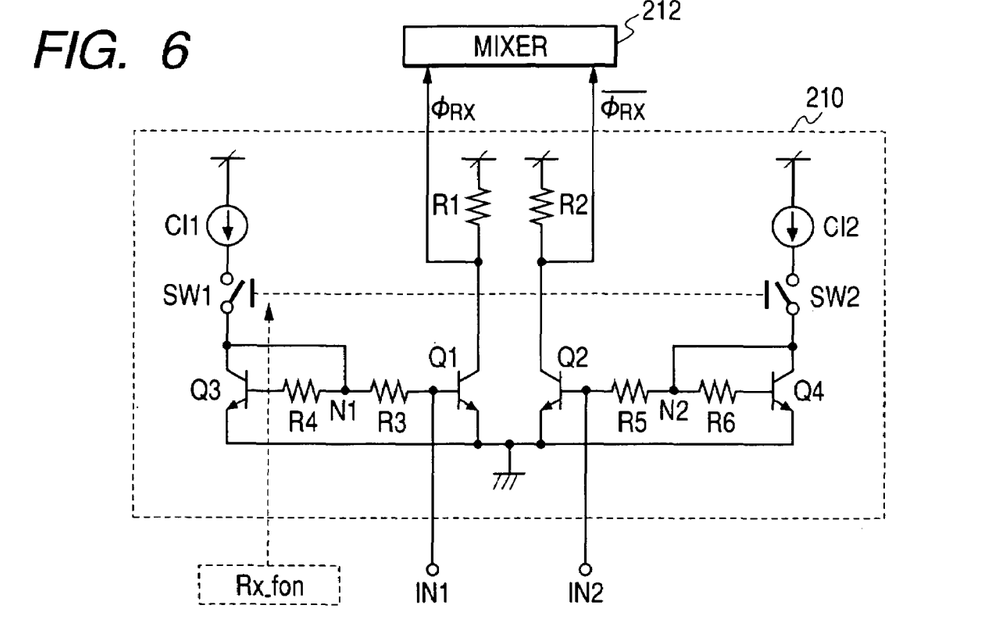
FIG. 6 is a circuit diagram illustrating a configurational example of an LNA (Low Noise Amplifier) employed in the reception system circuit according to the embodiment.

A specific circuit example of the LNA (Low Nose Amplifier) 210 is shown in FIG. 6. The LNA according to the present embodiment comprises a pair of differential input transistors Q1 and Q2 of which the emitters are connected in common and the base terminals are connected to their corresponding input terminals IN1 and IN2 of received signals, load resistors R1 and R2 respectively connected between the collectors of the transistors Q1 and Q2 and a power supply voltage Vcc, bias transistors Q3 and Q4 of which the base terminals are respectively connected to the base terminals of the transistors Q1 and Q2 via resistors R3, R4, R5 and R6, constant current sources CI1 and CI2 respectively connected between the collectors of the transistors Q3 and Q4 and the power supply voltage Vcc, and switches SW1 and SW2 connected in series with the constant current sources CI1 and CI2 respectively. When the switches SW1 and SW2 are on/off controlled by the control signal Rx_fon supplied from the control circuit 240, the circuit is brought to an operating state or a non-operating state.

The transistors Q3 and Q4 have collector terminals connected to a connecting node N1 of the resistors R3 and R4 and a connecting node N2 of the resistors R5 and R6 respectively and constitute a current mirror circuit together with the differential input transistors Q1 and Q2. When the switches SW1 and SW2 are respectively brought to an on state, predetermined bias voltages are respectively applied to the bases of the differential input transistors Q1 and Q2 to amplify the signals inputted to the input terminals IN1 and IN2. When the switches SW1 and SW2 are respectively brought to an off state, collector currents that flow through the transistors Q3 and Q4 are cut off so that the bases of the differential input transistors Q1 and Q2 are clamped to the neighborhood of a ground potential. Therefore, the circuit is brought to a non-operating state in which even if the signals inputted to the input terminals IN1 and IN2 change, the output voltages of the collectors of the transistors Q1 and Q2, i.e., the LNA remain substantially unchanged.

Figure 7:
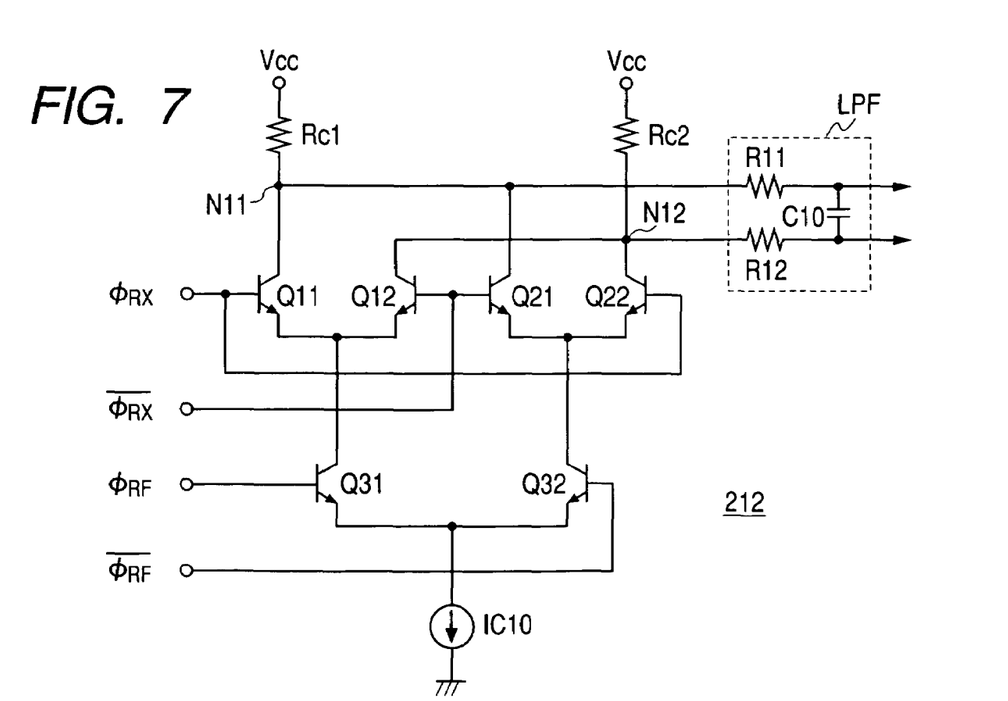
FIG. 7 is a circuit diagram showing a configurational example of a mixer circuit employed in the reception system circuit according to the embodiment.

A specific circuit example of the mixer 212 is shown in FIG. 7. The mixer according to the present embodiment comprises two sets of input differential transistor pairs Q11 and Q12, and Q1 and Q22 of which the emitters are respectively connected in common, a differential transistor pair Q31 and Q32 of which the collectors are respectively connected to the common emitters of these transistor pairs and the emitters are connected to each other, and both of which are operated like current switches, a constant current source IC10 connected to the common emitters of the transistor pair Q31 and Q32, and collector resistors Rc1 and Rc2 respectively connected between the collectors of the input differential transistors Q11 and Q21 and a power supply voltage Vcc and between the collectors of the transistors Q12 and Q22 and the power supply voltage Vcc. A low pass filter LPF1 comprising resistors R11 and R12 connected in series with their corresponding output signal lines, and a capacitor C10 connected between the output signal lines is connected to the output terminals of the mixer.

In the mixer 212 according to the present embodiment, the received signal ϕRX amplified by the LNA 210 and its inverted signal /ϕRX are inputted to the base terminals of the two sets of input differential transistor pairs Q11 and Q12, and Q21 and Q22. The high frequency oscillation signals ϕRF and /ϕRF generated by the RFVCO 250 are inputted to the base terminals of the transistor pair Q31 and Q32. Thus, a signal obtained by combining the received signal ϕRX and the high frequency signal ϕRF is outputted from each of output nodes N11 and N12. The signal is passed through the low pass filter LPF1 so that a high frequency component is eliminated. Thus, a signal having a frequency equal to the difference in frequency between the received signal ϕRX and the high frequency signal ϕRF produced from the RFVCO is supplied to the subsequent PGA.

A configurational example of a high frequency IC (RF-IC) and a wireless communication system to which the reception system circuit of the direct conversion system according to the embodiment of FIG. 1 is applied, will next be explained using FIG. 8.

Figure 8:
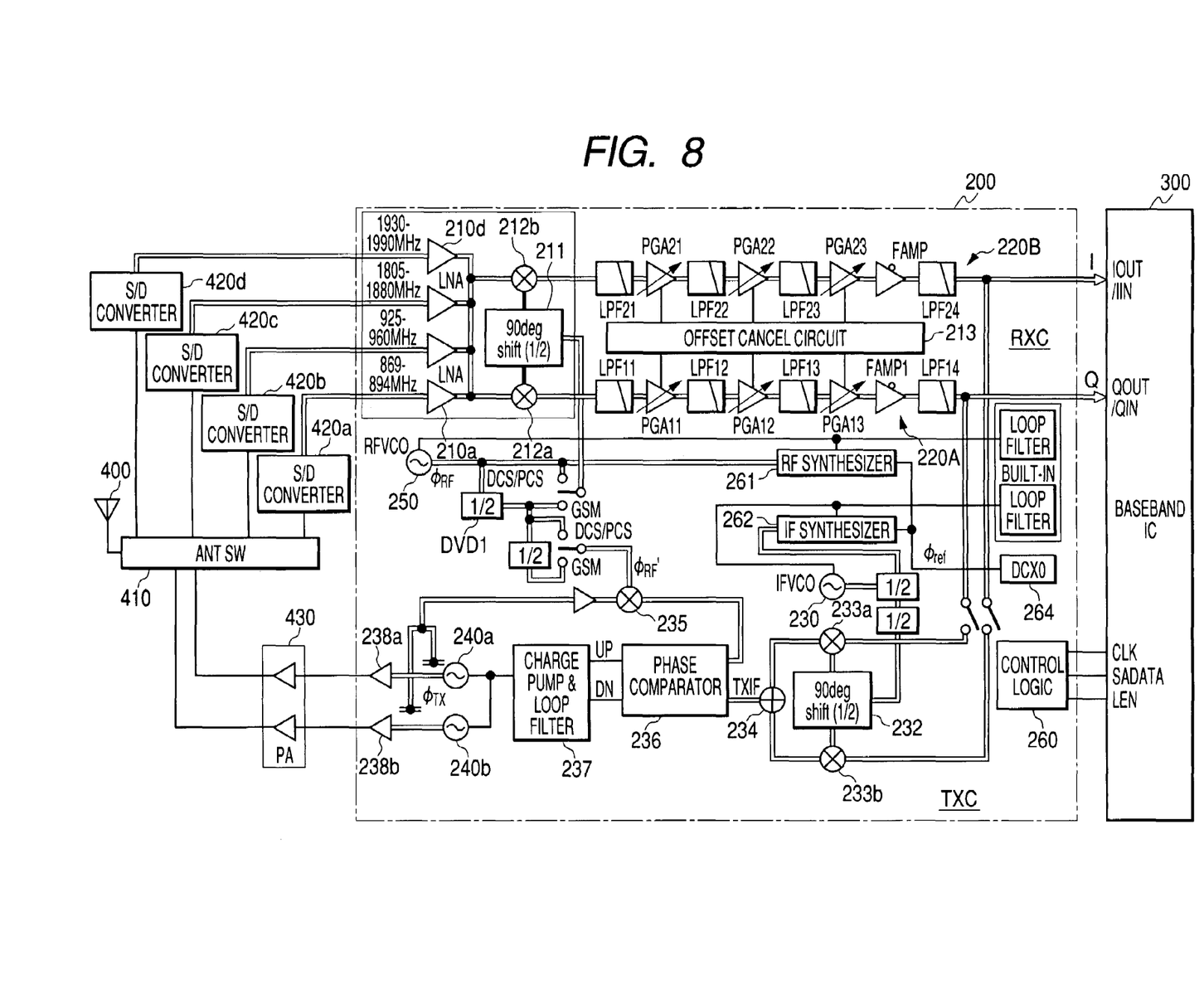
FIG. 8 is a block diagram showing a configurational example illustrative of a high-frequency IC and a wireless communication system to which the reception system circuit according to the embodiment is applied.

As shown in FIG. 8, the wireless communication system according to the embodiment comprises an antenna 400 for transmitting and receiving a signal wave, a transmit-receive switching means 410 comprising a changeover switch or a duplexer (branching filter), single-differential converters 420a through 420d each of which converts a single-phase received signal to a differential signal, a high frequency power amplifier circuit (power module) 430 which amplifies a transmit signal, a high frequency IC 200 which demodulates the received signal and modulates the transmit signal, a baseband circuit 300 which performs baseband processing such as conversion of transmit data into I and Q signals, extraction of receive data from the demodulated I and Q signals, etc. and controls the high frequency IC 200, etc. In the present embodiment, the high frequency IC 200 and the baseband circuit 300 are respectively configured over discrete semiconductor chips as a semiconductor integrated circuit device.

Although not restricted in particular, the high frequency IC 200 according to the present embodiment is configured so as to be capable of modulating and demodulating signals lying in four frequency bands, based on the communication systems of GSM850, GSM900, DCS1800 and PCS1900. The four single-differential converters 420a through 420d are provided correspondingly. When a simple changeover switch is used as the transmit-receive switching means 410, the single-differential converters 420a through 420d may share the functions of bandpass filters.

The high frequency IC 200 according to the present embodiment comprises a reception system circuit RXC, a transmission system circuit TXC, and a control system circuit comprising circuits common to the transmission system circuit, such as a control circuit, a clock generator, etc. other than those if roughly divided.

The reception system circuit RXC comprises low noise amplifiers 210a through 210d which respectively amplify received signals lying in the respective frequency bands of GSM850, GSM900, DCS1800 and PCS1900, a division phase shift circuit 211 which divides a local oscillation signal φRF generated by a high frequency oscillator (RFVCO) 250 and thereby generates quadrature signals phase-shifted 90° from each other, mixers 212*a* and 212*b* which mix the quadrature signals generated by the division phase shift circuit 211 into the received signals amplified by the low noise amplifiers 210*a* through 210*d* to thereby carry out demodulation and down-conversion of I and Q signals, high gain amplifier sections 220A and 220B common to the respective frequency bands, which respectively amplify the demodulated I and Q signals and output them to the baseband LSI 300, an offset cancel circuit 213 for canceling out DC offsets of amplifiers lying within the high gain amplifier sections 220A and 220B, etc.

The high gain amplifier section 220A has a configuration wherein a plurality of low pass filters LPF11, LPF12, LPF13 and LPF14 and programmable gain amplifiers PGA11, PGA12 and PGA13 are alternately connected in a series configuration with one another and an amplifier AMP1 whose gain is fixed is connected to the final stage. The high gain amplifier section 220A amplifies the demodulated I signal to a predetermined amplitude level while removing an unnecessary wave. Similarly, the high gain amplifier section 220B also has a configuration in which a plurality of low pass filters LPF21, LPF22, LPF23 and LPF24 and programmable gain amplifiers PGA21, PGA22 and PGA23 are alternately connected in a series configuration with one another and an amplifier AMP2 whose gain is fixed is connected to the final stage. The high gain amplifier section 220B amplifies the demodulated Q signal to a predetermined amplitude level.

The circuit shown in FIG. 1 is used as the offset cancel circuit 213. That is, the offset cancel circuit 213 comprises offset correction circuits OFC1 through OFC3 comprising A/D converters (ADC) and D/A converters (DAC) provided in association with the programmable gain amplifiers PGA11 through PGA13 and PGA21 through PGA23, and a control circuit 240 which controls these offset correction circuits to allow them to carry out offset cancel operations thereof.

The transmission system circuit TXC comprises an oscillator (IFVCO) 230 which generates an oscillation signal φIF having an intermediate frequency like, for example, 640 MHz, a division phase shift circuit 232 which divides the oscillation signal φIF generated by the oscillator 230 and thereby generates quadrature signals phase-shifted 90° from each other, modulators 233*a* and 233*b* respectively configured of mixers which modulate the generated quadrature signals on the basis of the I signal and Q signal supplied from the baseband circuit 300, an adder 234 which combines the modulated signals, transmission oscillators (TXVCO) 240*a* and 240*b* each of which generates a transmit signal φTX having a predetermined frequency, an offset mixer 235 which combines a feedback signal obtained by extracting the transmit signal φTX outputted from each of the transmission oscillators 240*a* and 240*b* by means of a coupler or the like and a signal φRF' obtained by dividing the oscillation signal φRF generated by the high frequency oscillator (RFVCO) 250 to thereby generate a signal having a frequency equivalent to the difference in frequency therebetween, a phase comparator 236 which compares the output of the offset mixer 235 and the signal TXIF combined by the adder 234 to thereby detect a difference in frequency and a difference in phase, a charge pump and loop filter 237 which generates a voltage corresponding to the output of the phase comparator 236, buffer circuits 238*a* and 238*b* which convert the differential outputs of the TXVCOs 240*a* and 240*b* into single signals and output the same therefrom, etc.

One of the transmission oscillators 240*a* and 240*b* is a circuit which generates a transmit signal lying in an 850 to 950 MHz band for GSM, whereas the other thereof is a circuit which generates a transmit signal lying in a 1800 to 1900 MHz band for DCS and PCS.

A control logic or control circuit 260 which controls the whole chip, an RF synthesizer 261 which constitutes a PLL circuit for RF together with the high frequency oscillator (RFVCO) 250, an IF synthesizer 262 which constitutes a PLL circuit for IF together with the intermediate frequency oscillator (IFVCO) 230, and a reference oscillator (DCXO) 264 which generates a clock signal φref used as a reference signal for these synthesizers 261 and 262, are provided over the chip for the high frequency IC 200 according to the present embodiment. The synthesizers 261 and 262 comprise phase comparators, charge pumps, loop filters, etc. respectively.

Incidentally, since the reference oscillation signal φref needs high frequency accuracy, an external crystal oscillator is connected to the reference oscillator 264. A frequency like 26 MHz or 13 MHz is selected as the reference oscillation signal φref. This is because the crystal oscillator with such a frequency is a general purpose part and is easily available.

The control circuit 260 is provided with a control register to which settings are made based on signals from the baseband IC 300. Described specifically, a synchronizing clock signal CLK, a data signal SDATA and a load enable signal LEN used as a control signal are supplied from the baseband IC 300 to the high frequency IC 200. When the load enable signal LEN is asserted effective in level, the control circuit 260 sequentially takes in the data signal SDATA transmitted from the baseband IC 300 in sync with the clock CLK and sets the same to the control register.

Although not restricted in particular, the data signal SDATA is serially transmitted. The baseband IC 300 is configured of a microprocessor or the like. The data signal SDATA contains commands to be supplied from the baseband IC 300 to the high frequency IC 200. The baseband IC 300 determines gain at each of the high gain amplifier sections 220A and 220B according to the level of the received signal and sends a code for designating the gain to the control circuit 260 of the high frequency IC 200. The control circuit 260 transmits the received gain designation code to the offset cancel circuit 213 as it is or decodes it and sends it to the offset cancel circuit 213.

The offset canceling control circuit 240 shown in FIG. 1 may be configured as part of the control circuit 260 which controls the entire chip. Alternatively, the control circuit 240 is configured as a circuit separate from the control circuit 260 and may be provided in the offset cancel circuit 213. Even in the case where the control circuit is configured as a discrete circuit, the register REG10 which sets the total gain of PGAs and the decoder DEC both contained in the control circuit 240 shown in FIG. 1 may be provided on the side of the control circuit 260. The registers REG21 and REG22 shown in FIG. 3 may similarly be provided on the side of either the control circuit 240 or 26.

In the wireless communication system of the multiband mode according to the present embodiment, the control circuit 260 changes the frequency of the oscillation signal of the high frequency oscillator 250 according to a channel to be used, upon transmission/reception in accordance with a command from the baseband IC 300, for example, and changes the frequency of the signal supplied to the offset mixer 235 in accordance with a GSM mode or DCS/PCS mode to thereby perform switching of a transmit frequency. Described specifically, the oscillation signal φRF of the high frequency oscillator 250 is supplied to the division phase shift circuit 211 as it is in a reception mode in the case of DCS and PCS. In the case of GSM, the oscillation signal φRF of the high frequency oscillator 250 is divided into ½ by DVD1, which in turn is supplied to the division phase shift circuit 211.

The oscillation frequency of the high frequency oscillator (RFVCO) 250 is set to a value different from one in the reception mode in a transmission mode. The oscillation frequency fRF of the high frequency oscillator (RFVCO) 250 in the transmission mode is set to, for example, 3616 to 3716 MHz in the case of GSM850, 3840 to 3980 MHz in the case of GSM900, 3610 to 3730 MHz in the case of DCS and 3860 to 3980 MHz in the case of PCS. The signal φRF having such an oscillation frequency is divided into ¼ by the corresponding divider in the case of GSM and divided into ½ in the case of DCS and PCS, which in turn is supplied to the offset mixer 235.

The offset mixer 235 outputs a signal equivalent to the difference (fRF−fTX) in frequency between the oscillation signal φRF outputted from the RFVCO 250 and the transmit oscillation signal φTX outputted from each of the transmission oscillators (TXVCO) TXVCOs 240a and 240b. A transmission PLL (TXPLL) is operated in such a manner that the frequency of the difference signal coincides with the frequency of the modulation signal TXIF. In other words, the TXVCOs 240a and 240b are controlled so as to oscillate with the frequency equivalent to the difference between the frequency (fRF/4 in the case of GSM and fRF/2 in the case of DCS and PCS) of the oscillation signal φRF outputted from the RFVCO 250 and the frequency of the modulation signal TXIF.

While the invention made above by the present inventors has been described specifically based on the embodiments, the present invention is not limited to the above embodiments. It is needless to say that various changes can be made thereto within the scope not departing from the gist thereof. Although the high gain amplifier circuit 220 comprises the three programmable gain amplifiers and one fixed gain amplifier in the embodiment, for example, the present invention is applicable even to a reception system circuit having a high gain amplifier circuit free of the fixed gain amplifier, a high gain amplifier circuit comprising two programmable gain amplifiers and one fixed gain amplifier, and a high gain amplifier circuit having four or more programmable gain amplifiers. Although the reception system circuit and the transmission system circuit are formed in one semiconductor chip in the high frequency IC according to the embodiment, they may be formed on discrete semiconductor chips respectively.

Although the respective offset correction circuits OFC1 through OFC3 provided corresponding to the programmable gain amplifiers PGA1 through PGA3 are respectively provided with the AD converters and the DA converters in the embodiment, the offset correction circuits OFC1 through OFC3 may be configured in such a manner that DA converters are respectively provided therein, and an AD converter is provided as a common circuit and changed over by a switch and used on a time-sharing basis to thereby correct offsets.

Further, although the threshold register REG21 for setting the threshold value to be compared with the gain set to the gain designation register REG10 upon mode selection is provided in the embodiment, the threshold value is fixed without providing the threshold register REG21, and the fixed threshold value and the gain set to the gain designation register REG10 may be compared upon mode selection to determine whether an offset cancel operation should be done in either the first operation mode or the second operation mode.

While the above description has principally been made of the case in which the invention made by the present inventors is applied to a high frequency IC employed in a cellular phone which belongs to the field of application reaching the background of the invention, the present invention is not limited to it. The present invention can be widely applied to a general semiconductor integrated circuit device having a reception system circuit that constitutes a wireless communication system.

What is claimed is:

1. A wireless communication semiconductor integrated circuit device comprising:
   a receiving circuit including,
      a differential amplifier circuit which amplifies a differential received signal;
      a mixer which combines the amplified received signal and an oscillation signal having a predetermined frequency to thereby perform frequency conversion; and
      a high gain amplifier circuit comprising a plurality of programmable gain amplifiers and a plurality of filters connected in a multistage,
   wherein the differential amplifier circuit is brought to a non-operating state to allow execution of an offset cancel operation of the programmable gain amplifier on the pre-stage side of the high gain amplifier circuit, and thereafter the differential amplifier circuit is brought to an operating state to allow execution of an offset cancel operation of the programmable gain amplifier corresponding to a final stage.

2. The wireless communication semiconductor integrated circuit device according to claim 1, further comprising:
   a register or control bit capable of setting whether or not such a series of offset cancel operations that the differential amplifier circuit is brought to the non-operating state to allow the execution of the offset cancel operation of the programmable gain amplifier on the pre-stage side of the high gain amplifier circuit and thereafter the differential amplifier circuit is brought to the operating state to allow the execution of the offset cancel operation of the programmable gain amplifier of the final stage, are executed.

3. A wireless communication system including:
   a wireless communication semiconductor integrated circuit device described in claim 2; and
   a baseband circuit which performs baseband processing on transmit and received signals,
   wherein the value set to the register or control bit is supplied from the baseband circuit to the wireless communication semiconductor integrated circuit device.

4. A wireless communication system comprising:
   a wireless communication semiconductor integrated circuit device described in claim 1;
   transmit-receive switching means which supplies a transmit signal outputted from a transmission circuit to an antenna terminal and supplies a signal received at the antenna terminal to a receiving circuit;
   single differential converters which converts the received signal from the transmit-receive switching means into a differential signal; and a baseband circuit which performs baseband processing on the transmit and received signals.

5. The wireless communication system according to claim 4, wherein data for designating the gain of the high gain amplifier circuit is supplied from the baseband circuit to the wireless communication semiconductor integrated circuit device.

6. A wireless communication semiconductor integrated circuit device comprising:
a receiving circuit including,
a differential amplifier circuit which amplifies a differential received signal;
a mixer which combines the amplified received signal and an oscillation signal having a predetermined frequency to thereby perform frequency conversion; and
a high gain amplifier circuit comprising a plurality of programmable gain amplifiers and a plurality of filters connected in a multistage,
wherein when the high gain amplifier circuit is operated with a first gain, the differential amplifier circuit is brought to a non-operating state to allow execution of an offset cancel operation of the first programmable gain amplifier of the high gain amplifier circuit, and thereafter the differential amplifier circuit is brought to an operating state to allow execution of an offset cancel operation of the second programmable gain amplifier to which the output of the first programmable gain amplifier is to be supplied, and
wherein when the high gain amplifier circuit is operated with a second gain, the differential amplifier circuit is brought to the non-operating state to execute in sequence the offset cancel operations of the first and second programmable gain amplifiers of the high gain amplifier circuit.

7. The wireless communication semiconductor integrated circuit device according to claim 6, further comprising:
a first register which sets a threshold value for determining which one of the two offset cancel operations is executed.

8. The wireless communication semiconductor integrated circuit device according to claim 7, further comprising:
a second register to which the gain of the high gain amplifier circuit is set, and a control circuit which compares the set value of the second register with the threshold value set to the first register to thereby determine which one of the two offset cancel operations is executed, and executes the selected offset cancel operation.

9. A wireless communication system including:
a wireless communication semiconductor integrated circuit device described in claim 8; and a baseband circuit which effects baseband processing on transmit and receive signals,
wherein the threshold values set to the first and second registers are supplied from the baseband circuit to the wireless communication semiconductor integrated circuit device.

10. The wireless communication semiconductor integrated circuit device according to claim 6, wherein the threshold value for determining which one of the two offset cancel operations is executed, is a fixed value.

11. The wireless communication semiconductor integrated circuit device according to claim 6, wherein the first gain is higher than the second gain.

12. A wireless communication semiconductor integrated circuit device comprising:
a receiving circuit including,
a differential amplifier circuit which amplifies a differential received signal;
a mixer which combines the amplified received signal and an oscillation signal having a predetermined frequency to thereby perform frequency conversion; and
an amplifier circuit having a plurality of stages each of which receives an output supplied from the mixer and which respectively have programmable gain amplifiers and filters and are coupled in series with one another,
wherein the differential amplifier circuit is brought to a non-operating state to allow execution of an offset cancel operation of the first programmable gain amplifier provided within the differential amplifier circuit, and thereafter the differential amplifier circuit is brought to an operating state to allow execution of an offset cancel operation of the second programmable gain amplifier to which a signal outputted from the first programmable gain amplifier is to be supplied.

13. The wireless communication semiconductor integrated circuit device according to claim 12, wherein when the amplifier circuit is operated with predetermined gain, the differential amplifier circuit is brought to the non-operating state to execute in sequence the offset cancel operations of the first and second programmable gain amplifiers.

14. The wireless communication semiconductor integrated circuit device according to claim 13, further including:
a register which sets a threshold value for determining whether the gain for operating the amplifier circuit is of the predetermined gain.

* * * * *